United States Patent [19]

Ikegami et al.

[11] Patent Number: 4,886,141

[45] Date of Patent: Dec. 12, 1989

[54] FOUR WHEEL DRIVE VEHICLE

[75] Inventors: Hiroshi Ikegami; Tetsuji Muto; Tetsuro Hamada; Katsuhiko Masuda; Kazuhiko Shimada; Kazunori Shibuya, all of Wako, Japan

[73] Assignee: Honda Giken Kogyo Kabushiki Kaisha, Tokyo, Japan

[21] Appl. No.: 203,970

[22] Filed: Jun. 8, 1988

[30] Foreign Application Priority Data

Jun. 8, 1987 [JP] Japan .................................. 62-142830
Jun. 29, 1987 [JP] Japan .................................. 62-161481

[51] Int. Cl.⁴ .............................................. B60K 17/34
[52] U.S. Cl. .................................... 180/233; 364/424.1
[58] Field of Search ............... 180/233, 247, 249, 250, 180/424.1

[56] References Cited

.U.S. PATENT DOCUMENTS 4,723,624 2/1988 Kawasaki et al. .................. 180/249
4,744,435 5/1988 Schnurer ......................... 180/247 X

FOREIGN PATENT DOCUMENTS 269527 6/1988 European Pat. Off. ............. 180/249

*Primary Examiner*—John A. Pekar
*Attorney, Agent, or Firm*—Armstrong, Nikaido, Marmelstein, Kubovcik & Murray

[57] ABSTRACT

In a multi-axle drive vehicle having a first axle which is directly coupled to a power source, and a second axle which is coupled to the power source by way of a coupling such as a viscous coupling which is adapted to transmit torque as a mathematical function of a difference in rotational speed between its input end and output end, to the end of eliminating the problems arising from transmission of braking force between the wheels of difference axles, the vehicle is further provided with a clutch for selectively interrupting transmission of power from the power source to the second axle, a brake sensor for detecting activation of a brake system of the vehicle, and a control unit for activating the clutch when the brake sensor has detected activation of the brake system. The conditions for activating the clutch may further include that the vehicle is running at a high speed which may be detected either directly or from a shift position of the power transmission system of the vehicle.

12 Claims, 6 Drawing Sheets

FOUR WHEEL DRIVE VEHICLE

TECHNICAL FIELD

The present invention relates to a multi-axle drive vehicle such as a four wheel drive vehicle and in particular to such a vehicle in which one of the axles is directly driven by a power source while one other axle is driven by way of a power coupling such as a viscous coupling which is adapted to transmit a torque according to a difference in rotational speed between its input and output shaft.

BACKGROUND OF THE INVENTION

A vehicle having two axles which can be directly coupled to a power source such as an internal combustion engine can stop with a relatively short braking distance as long as its tires ware within their slip limits, but, since the two axles are rigidly coupled to each other, no matter how ideally braking forces are applied to each of the tires, the braking forces are commonly transmitted to both the axles through the path of power transmission and rational distribution of braking forces to the different axles is not possible by any ordinary means.

In a four wheel drive vehicle using a viscous coupling in which torque is transmitted between the front and the rear axle according to the difference in the rotational speed of the two axles, this problem is much improved as compared to a simple four wheel drive vehicle in which the front and the rear axle are directly coupled by way of gears or the like which do not permit any slippage between the two axles, but this solution is based on a compromise or a trade-off. If the viscous coupling is hard, the advantage of four wheeel drive is enhanced but a favorble distribution of braking forces between the front and the rear axle cannot be accomplished. On the other hand, if the viscous coupling is soft, the advantage of the four wheel drive is lost but an unfavorable distribution of the braking forces can be avoided.

In view of this problem, it has been proposed in Japanese Patent Laid Open Publication No. 59-188731 to selectively disconnect the power transmission between the front axle or the engine and the rear axle by means of a one-way clutch. Thus, a drive torque can be transmitted from the front axle to the rear axle, but the braking force of the front axle is prevented from being transmitted to the rear axlee. However, according to this proposal, the braking action of the engine is also prevented from being transmitted to the rear axle. This is not desirable because engine brake is essential for a favorable handling of a vehicle powered by an internal combustion engine.

To the end of eliminating the above mentioned problems of four wheel drive vehicles using viscous couplings and other couplings whose power transmission properties depend on the difference in rotational speed between an input end and an output end thereof, it was proposed in a copending U.S. patent application No. 148,781 (based on Japanese patent application No. 62-17733 filed on Jan. 28, 1987) to combine a one-way clutch and torque limiting means in a parallel relationship so that an excessive braking force may be prevented from being transmitted to the rear wheels. In another copending US patent application Serial No. 148,804 filed Feb. 17, 1988 (based on Japanese patent application No. 62-17732 filed on Jan. 28, 1987), there is disclosed a combination of a pair of one-way clutches connected in parallel and opposite relationship with one of the clutches incorporating sprags which are made speeddependent in their function through centrifugal forces acting on them so that the braking force may be prevented from being transmitted to the rear wheels when the vehicle is running at high speed.

BRIEF SUMMARY OF THE INVENTION

In view of such problems of the prior art four wheel drive vehicles, a primary object of the present invention is to provide a multi-axle drive vehicle using a coupling whose torque transmission property depends on the difference in rotational speed between its input end and output end which is free from the problems arising from transmission of braking forces through the path of power transmission.

A second object of the present invention is to provide a multi-axle drive vehicle of the above named kind which offers the benefits of four wheel drive in most cases but is free from unfavorable distribution of braking force to different road wheels.

A third object of the present invention is to provide a simple and economical multi-axle drive vehicle.

These and other objects of the present invention can be accomplished by providing a multi-axle drive vehicle, comprising: a first axle which is directly coupled to a power source; a second axle which is coupled to the power source by way of coupling means which is adapted to transmit torque as a mathematical function of a difference in rotational speed between its input end and output end; clutch means for selectively interrupting transmission of power from the power source to the second axle; brake sensor means for detecting activation of a brake system of the vehicle; and control means for activating the clutch means when the brake sensor means has detected activation of the brake system.

The brake sensor means may consist of either an indirect sensor means such as a combination of a rotational speed sensor for detecting at least a difference in rotational speed between the input end and the output end of the coupling means and computing means for determining that the rotational speed of the input end is less than that of the output end by a certain prescribed value, or a direct sensor means such as a brake sensor for directly detecting activation of the brake system of the vehicle. Thus, any ill effect which may arise from activation of a brake system can be effectively eliminated. In this conjuction, it is possible to set a threshold in the activation level of the brake system. This is easily carried out in the former case by appropriately selecting the prescribed value. In the latter case, it can be accomplished by detecting a stroke of a brake pedal with a limit switch having a certain insensitive range or by detecting a certain threshold level of fluid pressure in fluid pressure activated brake system.

According to a preferred embodiment of the present invention, a rotational speed sensor for detecting a difference in rotational speed between the input end and the output end of the coupling means is utilized and the control means is adapted to activate the clutch means when the difference in rotational speed between the input end and the output end of the coupling means has exceeded a certain limit value and the brake sensor means has detected activation of the brake system. Thus, the condition for providing a four wheel drive is made broader by rationally limiting the condition for activating the clutch means.

According to another preferred embodiment of the present invention, a vehicle speed sensor for detecting a vehicle speed is utilized and the control means is adapted to activate the clutch means when the brake sensor means has detected activation of the brake system and the vehicle speed detected by the vehicle speed sensor has exceeded a certain limit value. The vehicle speed sensor may be replaced with a shift position sensor for detecting a shift position of a power transmission system of the vehicle. These limits placed on the condition for activating the clutch means reduce the possibility of disabling the four wheel drive condition.

The coupling means may be adapted to used either in series with the clutch means in the path of power transmission between the differential devices of the two axles or as a differential device having an input end coupled to the power source, and a pair of output ends which are connected to a right and a left wheel of the second axle. Typically, the coupling means consists of a viscous coupling.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
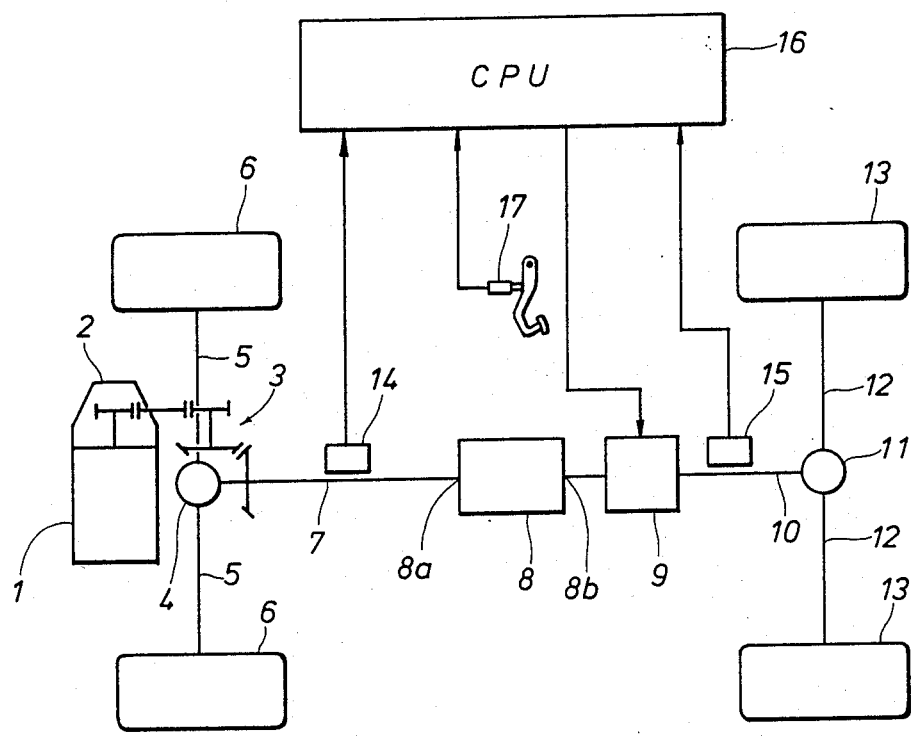
FIG. 1 is a schematic diagram of a power transmission system of a four wheel drive vehicle according to the present invention.

FIG. 1 is a schematic diagram of a power transmission system of a four wheel drive vehicle according to an embodiment of the present invention. Power output of an engine 1 is transmitted to a power splitter 3 consisting of a simple gear train by way of a conventional power transmission system 2. The power splitter 3 transmits power from an engine 1 to the right and the left front wheel 6 by way of a differential device 4 and corresponding front drive shafts 5, as well as to the input end 8a of a viscous coupling 8 by way of a front propeller shaft 7.

An output end 8b of the viscous coupling 8 is connected to an input end of a clutch 9 which may consist of an electromagnetic clutch whose output end is in turn connected to a rear propeller shaft 10. The rear end of the rear propeller shaft 10 is connected to a rear differential device 11 which is in turn connected to a right and a left rear wheel 13 by way of corresponding drive shafts 12.

The input end 8a and the output end 8b of the viscous coupling 8 are provided with rotational speed sensors 14 and 15, respectively, which supply their output signals to a CPU 16. The CPU 16 is also connected to a brake sensor 17 which detects an activation of a brake system by means of fluid pressure or a displacement of a brake pedal. The CPU 16 controls the action of the clutch 9 according to the output signals from the speed sensors 14 and 15 and the brake sensor 17.

Figure 2:
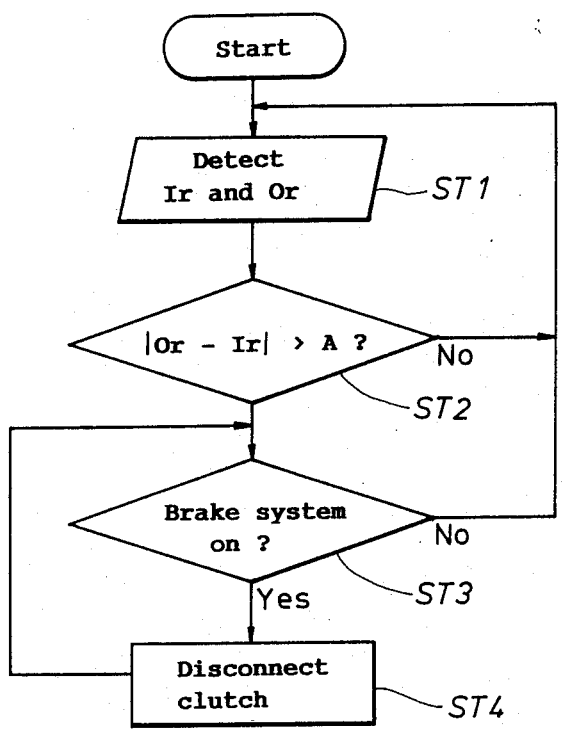
FIG. 2 is a flow chart for showing the basic operation of the first embodiment of the present invention illustrated in FIG. 1.

Now the manner of operation of the embodiment shown in FIG. 1 is described in the following with reference made to the flow chart given in FIG. 2.

First of all, rotational speeds Ir and Or of the input end 8a and the output end 8b of the viscous coupling 8 are obtained by the rotational speed sensors 14 and 15 and are supplied to the CPU 16 in ST1. In ST2, it is determined whether the absolute value of the difference in rotational speed between the input end 8a and the output end 8b of the viscous coupling 8 is greater than a certain predetermined value A or not. If the speed difference is not greater than the value A, it means that very little torque is being transmitted to the rear wheels and the system flow returns to ST1 to continue the monitoring of the speed difference. If the speed difference is greater than the value A, it means that an excessive torque is being transmitted to the rear wheels and the system flow advances to ST3.

In ST3, it is determined whether the brake system is activated or not. If that is the case, because it means that an excessive braking torque is being transmitted through the viscous coupling 8, the CPU 16 activates the electromagnetic clutch 9 to prevent undesirable transmission of the braking torque to the rear wheels in ST4, and the system flow returns to ST3 to continue the monitoring of the activation of the brake system. If the brake system is not found to be operative in ST3, it means that either a normal drive torque or a moderate brake torque, for instance, due to the braking action of the engine is being transmitted from the engine to the wheel wheels. Therefore, the state of the four wheel drive is maintained and the system flow returns to ST1 to resume the monitoring of the speed difference between the input end 8a and the output end 8b of the viscous coupling 8.

Figure 3:
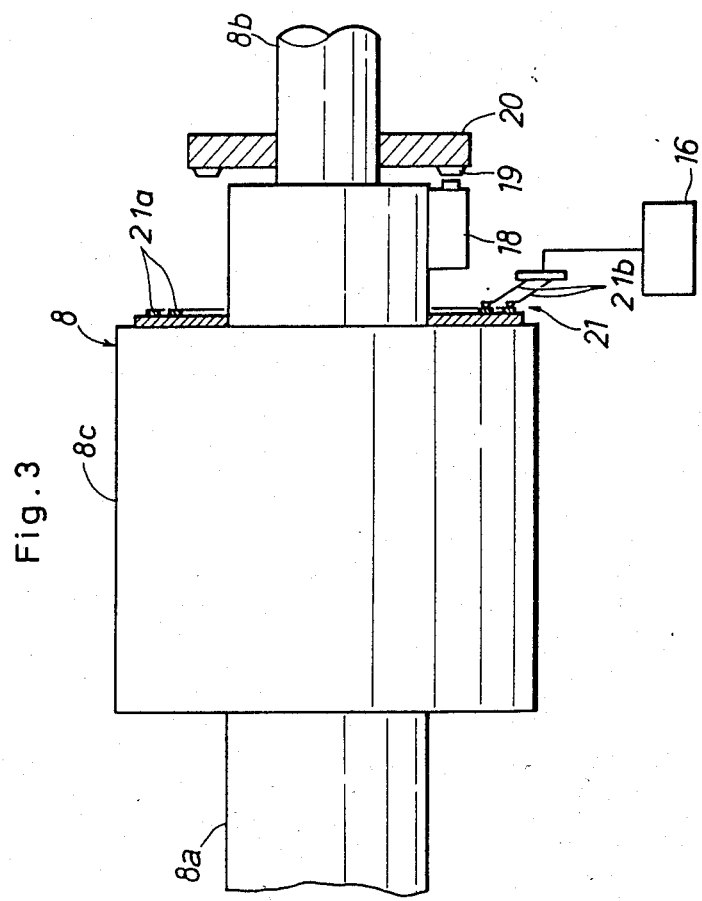
FIG. 3 is a side view of a viscous coupling showing a device for measuring the difference in rotational speed between the input shaft and the output shaft of the viscous coupling.

In the embodiment shown in FIG. 1, the rotational speeds of the input end 8a and the output end 8b of the viscous coupling 8 are individually detected by the rotational speed sensors 14 and 15. However, in the process described in conjuction with FIG. 2, only the difference between the speeds of the input end 8a and the output end 8b is required to be known. Therefore, it is possible to replace the two speed sensors 14 and 15 with a single speed difference sensor. FIG. 3 shows an example of such a speed difference sensor. In this case, the outer casing 8c of the viscous coupling 8 is integrally connected to the input end 8a of the viscous coupling 8 and a rear part of the casing 8c is provided with a proximity switch 18. To the output end 8b of the viscous coupling 8 is attached a concentric disc 20 having a set of crown gear teeth 19 opposite to the detecting end of the proximity switch 18 (which is connected to the input end 8a of the viscous coupling 8 by way of its casing 8c). A slip ring 21 is provided in an annular shoulder surface of the casing 8c and a pair of brushes 21b slide over a pair of electroconductive strips 21a provided in the slip ring 21.

Thus, the speed difference between the input end 8a and the output end 8b of the viscous coupling 8 is detected by the proximity switch 18 and its output signal is supplied to the CPU 16 by way of the slip ring mechanism 21.

In a modified embodiment of the present invention, the brake sensor 17 consists of a combination of a rotational speed sensor for detecting at least a difference in rotational speed between the input end and the output end of the viscous coupling 8 and computing means for determining that a rotational speed of the input end 8a is less than that of the output end 8b by a certain prescribed value. Provided that the vehicle is running forward, if the rotational speed of the output end 8b of the viscous coupling 8 is greater than that of the input end 8a of the viscous coupling 8, it means that an excessive braking torque is being transmitted through the viscous coupling 9 to the rear wheels. The CPU 16 therefore activates the clutch 9 to prevent the braking torque from being transmitted to the rear wheels.

In another modified embodiment of the present invention, the brake sensor 17 consists of a stroke sensor for detecting the stroke of a brake pedal with a certain insensitive range or a pressure sensor which detects a certain threshold level of the fluid pressure of the brake system. The output from the brake sensor 17 thus indicates the generation of a substantial braking force which is transmitted to the rear wheels through the viscous coupling 8. The CPU 16 therefore activates the clutch 9 to prevent the braking torque from being transmitted to the rear wheels.

Figure 4:
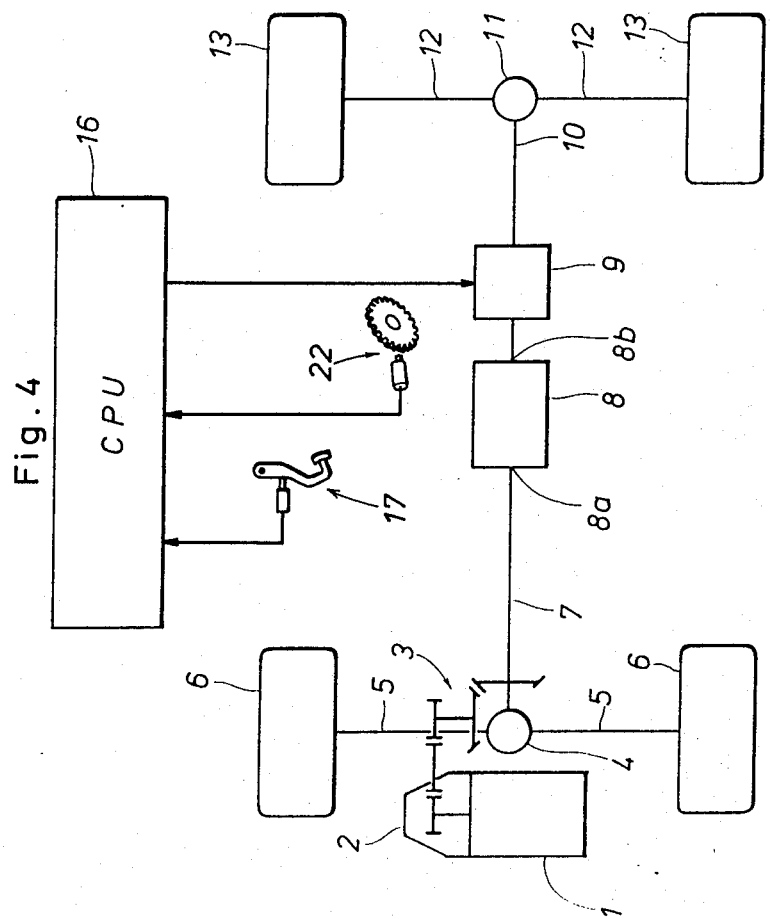
FIG. 4 is a view similar to FIG. 1 showing a second embodiment of the present invention.

FIG. 4 shows a second embodiment of the present invention. In this embodiment, the CPU 16 receives output signals from a brake sensor 17 and a speed sensor 22 which detects the speed of the vehicle, for instance as an average of the rotational speeds of the four road wheels.

Figure 5:
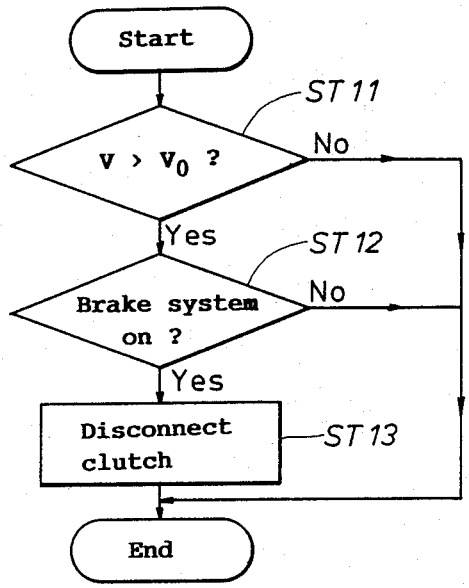
FIG. 5 is a flow chart for showing the basic operation of the second embodiment of the present invention illustrated in FIG. 4.

FIG. 5 shows the control flow of the embodiment shown in FIG. 4. In ST11, if the vehicle speed V as detected by the speed sensor 22 is found to be greater than a predetermined value $V_0$, it is then determined if the brake system is being activated or not in ST12. If the vehicle speed V is greater than the prescribed value $V_0$ and the brake is being applied, the electromagnetic clutch 9 is then disconnected in ST13. If the vehicle speed V is not greater than the prescribed value $V_0$ or the brake is not being applied, the step of disconnecting the electromagnetic clutch 9 (ST13) is bypassed and the four wheel drive condition is maintained. This is advantageous because the distribution of braking force to different wheels is not important in low speed range, and the benefits of four wheel drive and application of greatest possible braking force to each of the wheels far outweigh the benefits which may be derived by appropriately distributing the braking force to each of the four wheels. For instance, when the vehicle is going down a steep slope, the advantage of the four wheel drive is maintained while the engine brake and the foot brake are both effective.

Figure 6:
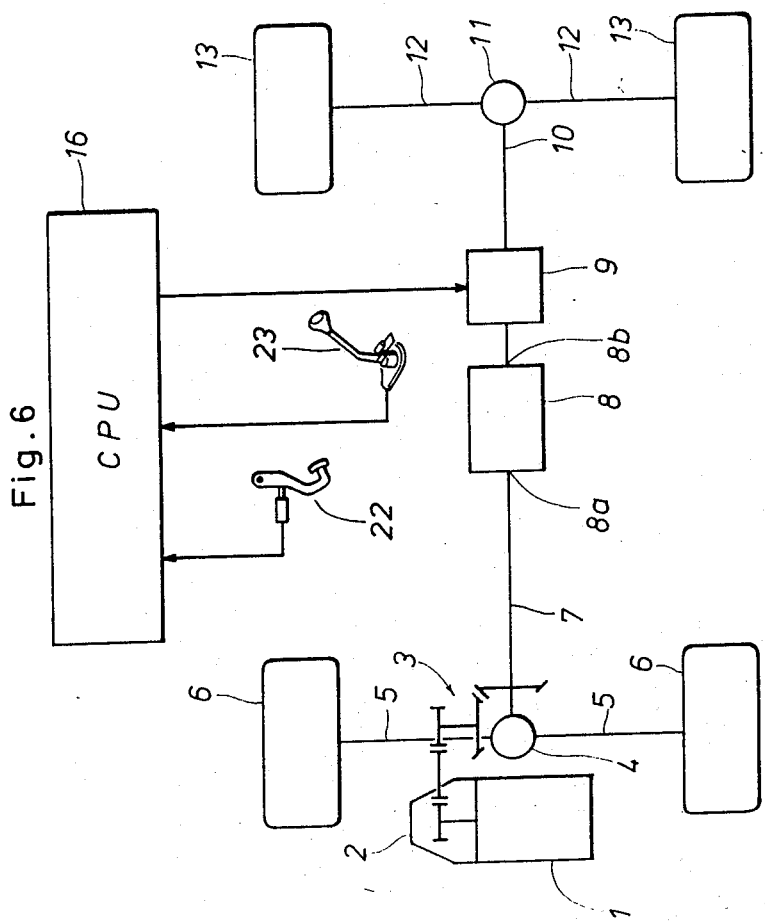
FIG. 6 is a view similar to FIG. 1 showing a third embodiment of the present invention.

FIG. 6 shows a fourth embodiment of the present invention. In this embodiment, the CPU 16 receives output signals from a brake sensor 17 and a shift position sensor 23 which detects the speed stage of the transmission of the vehicle (which may be an automatic transmission or a manual transmission system).

Figure 7:
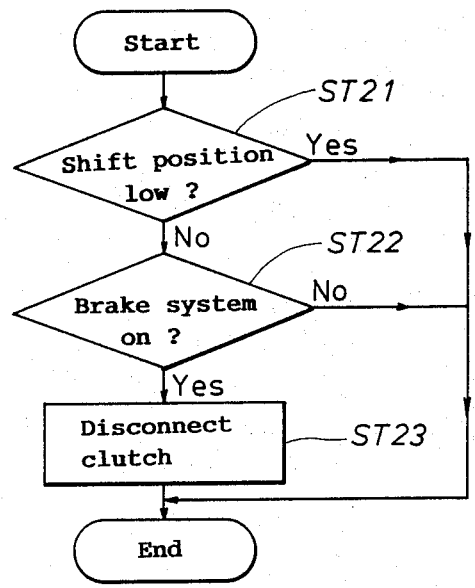
FIG. 7 is a flow chart for showing the basic operation of the third embodiment of the present invention illustrated in FIG. 6.

FIG. 7 shows the control flow of the embodiment shown in FIG. 6. In ST21, if the shift position as detected by the shift position sensor 23 is SL (super low), L (low) or R (reverse), it is then determined if the brake system is being activated or not in ST22. If the speed stage is SL, L or R and the brake is being applied, the electromagnetic clutch 9 is then disconnected in ST23. If the speed stage is other than SL, L or R or the brake is not being applied, the step of disconnecting the electromagnetic clutch 9 (ST23) is bypassed and the four wheel drive condition is maintained. This is advantageous because the distribution of braking force to different wheels is not important in low speed range, and the benefits of four wheel drive and application of greatest possible braking force to each of the wheels far outweigh the benefits which may be derived by appropriately distributing the braking force to each of the four wheels. In short, this embodiment offers similar advantages as those of the preceding embodiment.

Figure 8:
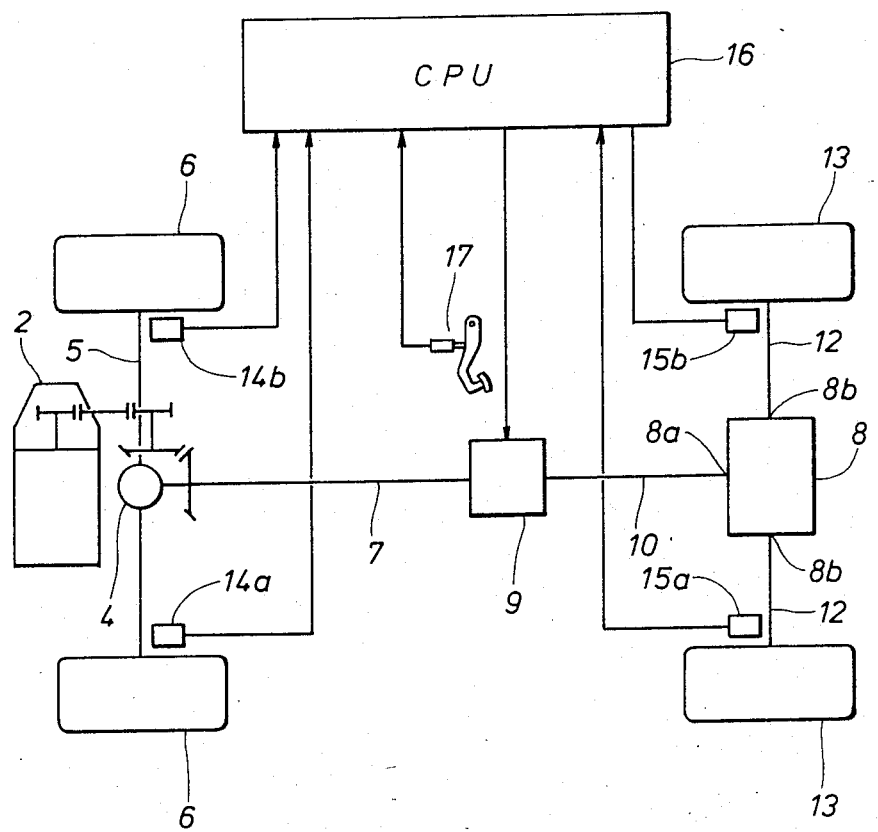
FIG. 8 is a view similar to FIG. 1 showing a fourth embodiment of the present invention.

FIG. 8 shows yet another embodiment of the present invention. In this embodiment, the viscous coupling 8 also serves as a differential device for the rear wheels 13. Specifically, the rear end of the front propeller shaft 7 is connected to the front end of the rear propeller shaft 10 by way of an electromagnetic clutch 9, and the rear end of the rear propeller shaft 10 is connected to an input end 8a of the viscous coupling 8. This viscous coupling 8 is provided with a pair of output ends 8b which are connected to the drive shafts 12 of the corresponding rear wheels 13. Each of the road wheels 6 and 13 is provided with a rotational speed sensor 14a, 14b, 15a and 15b, and the outputs from these rotational speed sensors are supplied to the CPU 16 which computes the rotational speeds of the input end 8a and the output ends 8b of the viscous coupling by appropriate arithmetic operations. The rotational speeds thus derived are used for the control of the electromagnetic clutch 9 in any of the previously described manners.

While the invention has been particularly shown and described in reference to preferred embodiments thereof, it will be understood by those skilled in the art that changes in form and details may be made therein without departing from the spirit and scope of the invention.

What we claim is:
1. A multi-axle drive vehicle, comprising:
   a first axle directly coupled to a power source;
   a second axle coupled to the power source by way of coupling means for transmitting torque as a mathematical function of a difference in rotational speed between an input end and an output end of the coupling means;
   clutch means for selectively interrupting transmission of power from the power source to the second axle;
   brake sensor means for detecting activation of a brake system of the vehicle;
   a rotational speed sensor means for detecting a difference in rotational speed between the input end and the output end of the coupling means; and
   control means for activating the clutch means relative to an output from the brake sensor means and an output from the rotational speed sensor means.

2. A multi-axle drive vehicle as defined in claim 1, wherein the brake sensor means comprises a rotational speed sensor for detecting at least a difference in rotational speed between the input end and the output end of the coupling means and computing means for determining that a rotational speed of the input end is less than that of the output end by more than a certain prescribed value.

3. A multi-axle drive vehicle as defined in claim 1, wherein the brake sensor means comprises a brake sensor for directly detecting activation of the brake system of the vehicle.

4. A multi-axle drive vehicle as defined in claim 1, wherein the control means activates the clutch means when the difference in rotational speed between the input end and the output end of the coupling means has exceeded a certain limit value and the brake sensor means has detected activation of the brake system.

5. A multi-axle drive vehicle as defined in claim 1, wherein the coupling means comprises an input end coupled to the power source, and a pair of output ends which are connected to a right and a left wheel of the second axle.

6. A multi-axle drive vehicle as defined in claim 1, wherein the coupling means comprises a viscous coupling.

7. A multi-axle drive vehicle, comprising:
a first axle directly coupled to a power source;
a second axle coupled to the power source by way of coupling means for transmitting torque as a mathematical function of a difference in rotational speed between an input end and an output end of the coupling means;
clutch means for selectively interrupting transmission of power from the power source to the second axle;
brake sensor means for detecting activation of a brake system of the vehicle;
vehicle speed detecting means for detecting a vehicle speed; and
control means for activating the clutch means relative to an output from the brake sensor means and the vehicle speed detecting means.

8. A multi-axle drive vehicle as defined in claim 7, wherein the vehicle speed detecting means has a vehicle speed sensor, and the control means activates the clutch means when the brake sensor means has detected activation of the brake system and the vehicle speed sensor has detected a vehicle speed exceeding a certain limit value.

9. A multi-axle drive vehicle as defined in claim 7, wherein the vehicle speed detecting means has a shift position sensor for detecting a shift position of a power transmission system of the vehicle, and the control means activates the clutch means when the brake sensor means has detected activation of the brake system and the shift position sensor has detected a relatively high speed shift position.

10. A multi-axle drive vehicle as defined in claim 7, wherein the brake sensor means comprises a rotational speed sensor means for detecting at least a difference in rotational speed between the input end and the output end of the coupling means and computing means for determining that a rotational speed of the input end is less than that of the output end by more than a certain prescribed value.

11. A multi-axle drive vehicle as defined in claim 7, wherein the brake sensor means comprises a brake sensor for directly detecting activation of the brake system of the vehicle.

12. A multi-axle drive vehicle as defined in claim 7, wherein the coupling means comprises a viscous coupling.

* * * * *